United States Patent [19]
Geringer

[11] Patent Number: 5,823,278
[45] Date of Patent: Oct. 20, 1998

[54] CASTER MOUNTED WEIGHING SYSTEM

[75] Inventor: E. Randy Geringer, Westport, Conn.

[73] Assignee: Future Systems, Inc., Westport, Conn.

[21] Appl. No.: 468,268

[22] Filed: Jun. 6, 1995

Related U.S. Application Data

[63] Continuation-in-part of Ser. No. 322,787, Oct. 13, 1994.

[51] Int. Cl.$^6$ .............................. G01G 19/52; G01G 19/00
[52] U.S. Cl. ........................... 177/144; 177/245; 177/199
[58] Field of Search ..................................... 177/136, 143, 177/199, 200, 126, 229, 211, 45, 244, 245, 239

[56] References Cited

U.S. PATENT DOCUMENTS

| | | | |
|---|---|---|---|
| 2,458,481 | 1/1949 | Ruge | 177/211 |
| 3,338,323 | 8/1967 | Swersey | 177/244 |
| 3,722,611 | 3/1973 | Tirkkonen | 177/144 |
| 3,961,675 | 6/1976 | Siegel | 177/126 |
| 4,015,677 | 4/1977 | Silva et al. | 177/165 |
| 4,033,420 | 7/1977 | De Masters | 177/126 |
| 4,038,973 | 8/1977 | Moore | 128/113 |
| 4,065,932 | 1/1978 | Shoberg | 177/136 |
| 4,162,628 | 7/1979 | Oetjen et al. | 177/211 |
| 4,242,672 | 12/1980 | Gault | 340/573 |
| 4,281,730 | 8/1981 | Swersey et al. | 177/144 |
| 4,312,241 | 1/1982 | Budraitis | 73/862.35 |
| 4,363,368 | 12/1982 | Paddon et al. | 177/144 |
| 4,420,052 | 12/1983 | Hale | 177/132 |
| 4,453,422 | 6/1984 | Yorgindis | 73/862.66 |
| 4,453,608 | 6/1984 | Wirth et al. | 177/210 FP |
| 4,459,863 | 7/1984 | Nordstrom | 73/862.66 |
| 4,600,066 | 7/1986 | Griffen et al. | 177/211 |
| 4,616,511 | 10/1986 | Ginty et al. | 177/211 |
| 4,657,097 | 4/1987 | Griffen | 177/211 |
| 4,666,003 | 5/1987 | Reichow | 177/136 |
| 4,669,136 | 6/1987 | Waters et al. | 5/66 |
| 4,788,741 | 12/1988 | Hilborn | 16/35 R |
| 4,793,428 | 12/1988 | Swersey | 177/144 |
| 4,799,562 | 1/1989 | Burrows | 177/229 |
| 4,801,152 | 1/1989 | Elliott et al. | 280/47.34 |
| 4,813,504 | 3/1989 | Kroll | 177/211 |
| 4,878,551 | 11/1989 | Watkins et al. | 177/139 |
| 4,899,840 | 2/1990 | Boubille | 177/139 |
| 4,905,780 | 3/1990 | Goff, III | 177/136 |
| 4,926,951 | 5/1990 | Carruth et al. | 177/144 |
| 4,934,468 | 6/1990 | Koerber, Sr. et al. | 177/144 |

(List continued on next page.)

FOREIGN PATENT DOCUMENTS

WO 81/01196  4/1981  United Kingdom.

OTHER PUBLICATIONS

Hill–ROM Advance 2000 Model Bed Brochure, including excerpts from instructions for use of Advance 2000 Bed. Author unknown. time and place of publication unknown.

Primary Examiner—Renee S. Luebke
Assistant Examiner—Randy W. Gibson
Attorney, Agent, or Firm—Seyfarth, Shaw, Fairweather & Geraldson

[57] ABSTRACT

A caster mounted weighing system comprised of at least three weigh modules mounted to the bottom of a bed, container, or other surface suitable for weighing, a control unit, a junction box, and a means for transmitting signals to and from the weigh modules, junction box, and control unit. The weigh module may be comprised of a caster, which rests on the floor, a load cell attached to the caster, strain gauges or other means for measuring the load applied to the load cell, a stem or other attachment means which permits the weigh module to be mounted to the bottom of a bed frame, container, or other surface suitable for weighing, and a circuit board or other data storage means. In alternate embodiments, each weigh module may be comprised of a plurality of casters centered below a caster plate, the weigh modules may incorporate an isolation system to minimize eccentricities, or the weigh modules may be secured to the bed or container by a collar or clamp, rather than by a stem, or the weigh modules may rest on non-rolling elements.

35 Claims, 5 Drawing Sheets

U.S. PATENT DOCUMENTS

| | | | |
|---|---|---|---|
| 4,953,244 | 9/1990 | Koerber, Sr. et al. | 177/144 |
| 4,961,470 | 10/1990 | Koerber, Sr. | 177/144 |
| 4,974,692 | 12/1990 | Carruth et al. | 177/144 |
| 5,076,375 | 12/1991 | Dillon et al. | 177/45 |
| 5,083,624 | 1/1992 | Reichow | 177/139 |
| 5,086,856 | 2/1992 | Haggstrom | 177/161 |
| 5,099,702 | 3/1992 | French | 73/862.68 |
| 5,172,781 | 12/1992 | Hlavinka et al. | 177/144 |
| 5,173,977 | 12/1992 | Carruth et al. | 177/144 |
| 5,190,116 | 3/1993 | Reichow | 177/211 |
| 5,199,131 | 4/1993 | Harris | 16/21 |
| 5,237,501 | 8/1993 | Gusakov | 364/413.01 |
| 5,269,388 | 12/1993 | Reichow et al. | 177/144 |
| 5,276,432 | 1/1994 | Travis | 340/573 |
| 5,279,010 | 1/1994 | Ferand et al. | 5/600 |
| 5,293,007 | 3/1994 | Darst et al. | 177/229 |
| 5,319,817 | 6/1994 | Hay et al. | 177/144 |
| 5,336,854 | 8/1994 | Johnson | 177/210 FP |
| 5,511,571 | 4/1996 | Adrezin et al. | 73/379.08 |

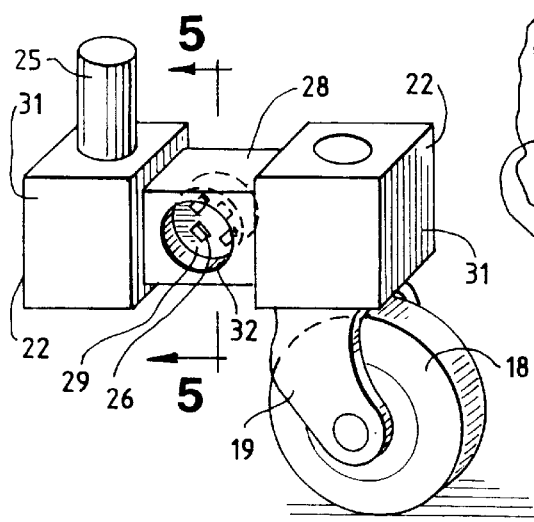
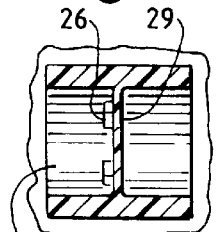
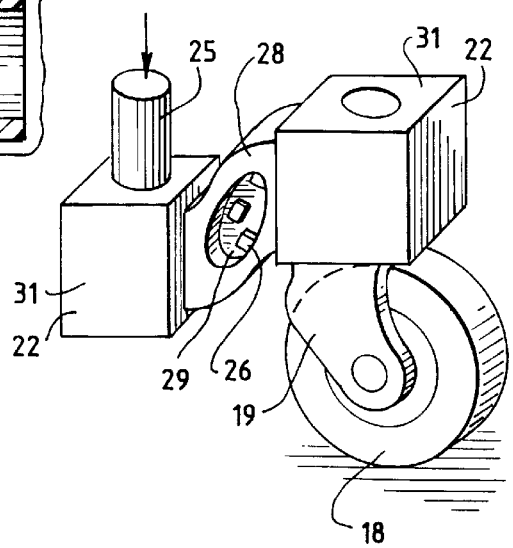
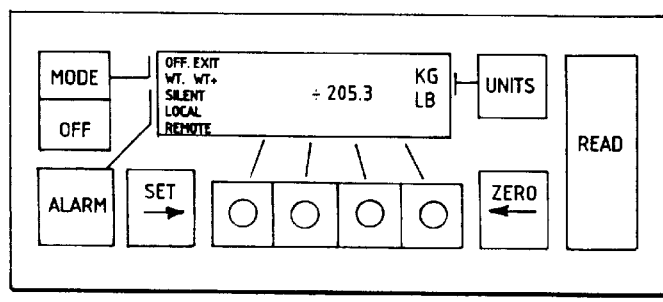
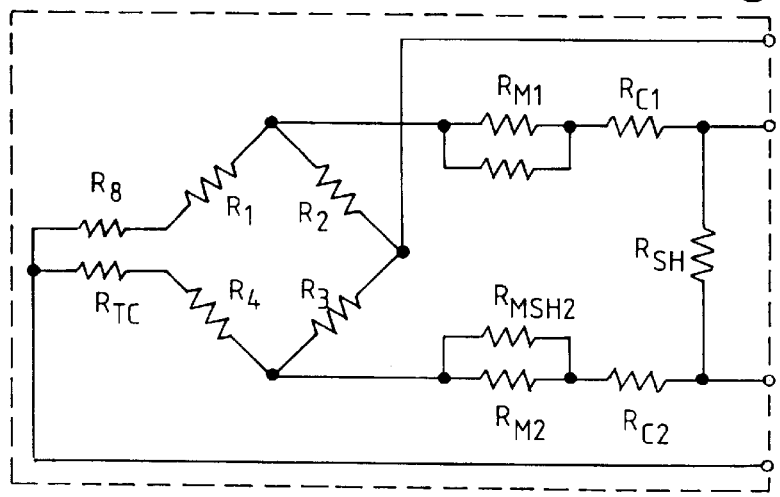

CASTER MOUNTED WEIGHING SYSTEM

This is a continuation-in-part of application Ser. No. 08/322,787, filed Oct. 13, 1994.

FIELD OF THE INVENTION

The caster mounted weighing system of the present invention may be used in a variety of applications involving the weighing of people or objects in various settings. For example, the present invention may be used in an in-bed patient weighing system, for weighing bulk materials on rolling carriers, or for any other application in which a person or object must be weighed while it is in a container or on a surface, such as shelving.

BACKGROUND OF THE INVENTION

It is frequently desirable to accurately monitor the weight of a patient confined to a bed, whether in a hospital, at home, or in other treatment settings, and to observe changes in weight to monitor the health of the patient and ensure that proper dosages of medication are administered. It is difficult, however, to weigh seriously ill patients or patients with limited mobility by removing the patient from the bed on a regular basis. Critically ill patients, in particular, may require frequent weighing, with their severe physical condition preventing their removal from bed.

Beds incorporating weighing systems, such that the patient need not be removed from the bed to be weighed, have been disclosed, for example, in Reichow et al., U.S. Pat. No. 5,269,388, and Carruth et al., U.S. Pat. No. 4,926,951. The system disclosed in Reichow et al. utilizes load cells which are rigidly mounted along the sides of the bed frame. The Carruth system utilizes a separate weigh frame mounted to the bed frame. These systems are generally an integral part of the bed, and must be incorporated into the bed when it is manufactured. Beds incorporating these weighing systems are generally more expensive than ordinary beds without a weighing system, and are also heavier, making it more difficult to move such beds.

The caster mounted weighing system may also be used to address a number of other types of weighing applications, in addition to bed weighing systems. In many applications, it would be desirable to retrofit a device which was not originally designed to be a scale with a weighing system. For example, in some circumstances, it may be desirable to determine the weight of bulk material stored in a large container (e.g. storage tub) without removing the material from the container or placing the container on a scale. Accurately weighing the material may be difficult, if not impossible, unless the material is contained within the container. Yet, a container filled with bulk material is generally heavy and difficult to move; moving the container onto a scale may be difficult and time-consuming. It might also be desirable to determine the weight of materials stored on fixed shelving or storage racks, without removing the material from the shelf or storage area. Thus, it would be desirable to retrofit a container or weight bearing surface with a weighing device so that materials may be weighed without removal from the container or surface.

It is, therefore, an object of this invention to provide a relatively inexpensive, accurate weighing system which may be installed on a bed.

It is also an object of this invention to provide a relatively inexpensive, accurate weighing system which may be installed on a container, shelving unit, or other surface suitable for weighing.

It is a further object of this invention to provide a weighing system which may be retrofit to an existing bed, container, or other surface suitable for weighing, and need not be installed at the time of original manufacture.

SUMMARY OF THE INVENTION

These objects and others are achieved by the caster mounted weighing system of the present invention, which is comprised of at least three weigh modules, or caster assemblies, mounted to the bottom of a bed, container, or other surface suitable for weighing, a control/display unit and a means for transmitting signals to and from the weigh modules and control unit. The weigh module may be comprised of a caster or support, which rests on the floor, a caster or support plate or other attachment means mounted to the top of the caster or support, a load cell mounted to the top of the attachment means, strain gauges or other means for measuring the load applied to the load cell, a stem or other attachment means which permits the weigh module to be mounted to the bottom of a bed frame, container, or other surface suitable for weighing and a circuit board or comparable means for incorporating an analog/digital converter, a microprocessor and some memory capacity. To accurately weigh a patient in a hospital bed, or the contents of a container or weight bearing surface, the load applied to each of the weigh modules is measured at the weigh module and transmitted to the control/display unit through a cable. The zero and span calibration values for each individual weigh module can be stored on non-volatile memory in the weigh module or control/display unit so that each weigh module can act as a unique scale. The load applied to the bed is summed by digitally adding the individual loads applied to each of the weigh modules, thereby reducing the error contributed by unequal span values when the weigh modules are summed in the traditional analog manner. The weight of the patient, or contents of the container, is displayed on the control/display unit.

In alternate embodiments, other forms of casters, rolling balls, and distributed rolling elements may be used, the rolling elements may be supported or suspended in their attachment to the load cells, the weigh modules may be secured to the bed or container by a collar, clamp, or other attachment means, rather than by a stem, or the weigh modules may rest on non-rolling elements.

This system may be installed during manufacture of the bed frame or weight bearing device, or it may be installed on existing beds or devices by removing the existing casters or supports from the bed or device and replacing them with the weigh modules of the present invention. The system is relatively inexpensive to implement, because only the casters or supports of the bed or container must be replaced. And it is accurate to the accuracy level of the load cell, strain gauges, weigh module and control/display unit circuitry; in typical applications, this is 0.1% of the full scale reading.

Further objects, features, and advantages of the invention will become evident from a consideration of the following detailed description when taken in conjunction with the accompanying drawings and the appended claims.

BRIEF DESCRIPTION OF THE DRAWINGS

For the purpose of facilitating an understanding of the invention there are illustrated in the accompanying drawings preferred embodiments thereof, from an inspection of which, when considered in connection with the following description, the construction and operation of the invention, and many of its advantages, should be readily understood and appreciated.

FIG. 4 is a perspective view of an alternate embodiment of the weigh module of the in-bed weighing system;

FIG. 5 is an enlarged cross-sectional view of the load cell portion of the weigh module shown in FIG. 4;

FIG. 6 is a perspective view of the embodiment of the weigh module, shown in FIG. 4, in a deformed state, illustrating its response when a load to be measured is applied to the weigh module;

FIG. 7 is a front view of one embodiment of the control panel of the in-bed weighing system;

FIG. 8 is a schematic diagram of one embodiment of the control unit for the in-bed patient weighing system;

DETAILED DESCRIPTION OF THE PREFERRED EMBODIMENT

Figure 1:
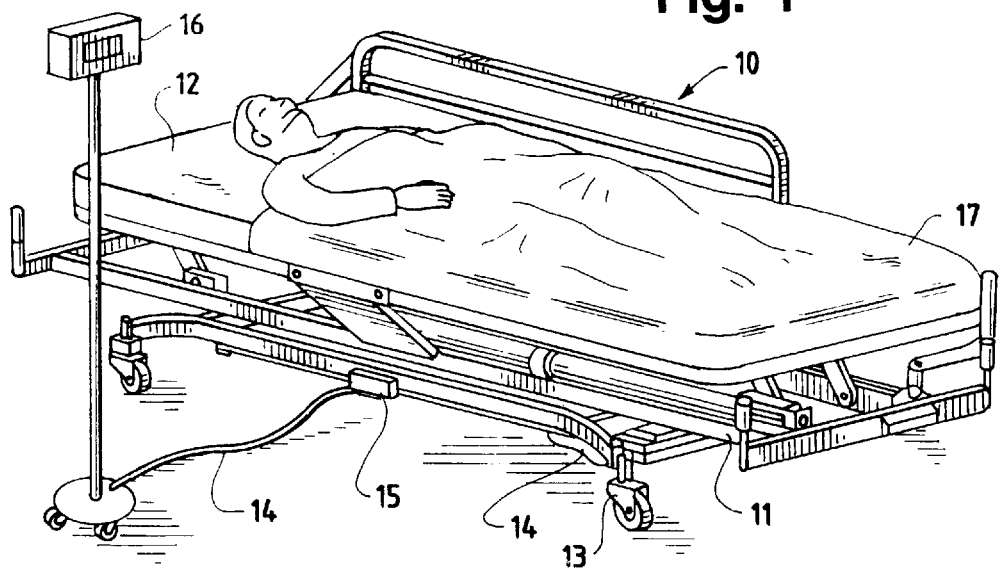
FIG. 1 is a perspective view of a bed including the in-bed weighing system.

The caster mounted weighing system as used in an in-bed weighing system is shown in FIG. 1. The system is comprised of weigh modules 13 mounted to each of the four corners of the bed frame 11 of a bed 10, a junction box 15, a control/display unit 16, and means 14 for transmitting signals to and from the control unit 16, the junction box 15, and the weigh modules 13. In a preferred embodiment, the control/display unit also performs the function of the junction box 15, and the junction box is omitted.

Figure 2:
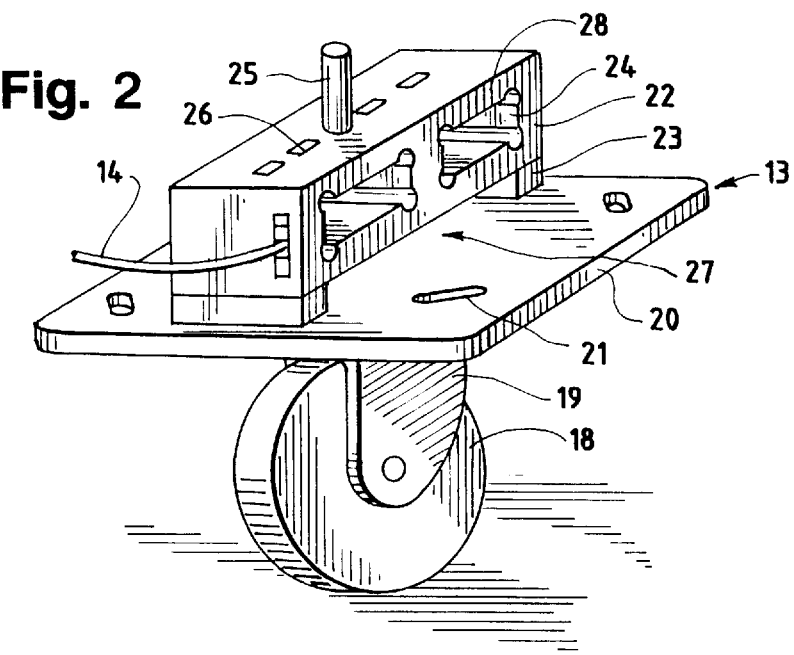
FIG. 2 is a perspective view of one embodiment of the weigh module of the in-bed weighing system.
Figure 3:
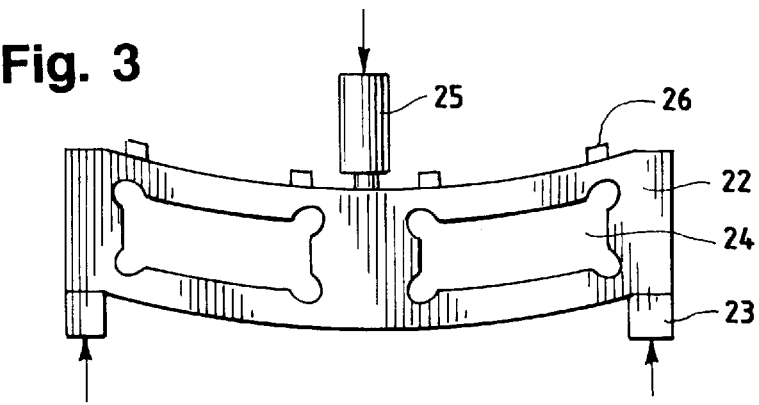
FIG. 3 is a side view of the weigh module, shown in FIG. 2, in a deformed state, illustrating its response when a load to be measured is applied to the weigh module.

One embodiment of a weigh module 13 is illustrated in FIGS. 2 and 3. The weigh module 13 includes a caster 18 mounted to a caster top plate 20 by a mounting bracket 19. The caster 18 may be any type of rolling device. Holes 21 in the top plate 20 may be used to attach a cover or shroud for cosmetic purposes. The mounting bracket 19 may be attached to the top plate 20 by inserting a stem portion of the mounting bracket 19 into the top plate 20 or by a commercially available circular bearing. A load cell 22, which may be connected to a bed frame 11 by means of a stem 25, is mounted on top of the top plate 20. In the embodiment shown in FIG. 2, a load cell 22 is comprised of a deformable section 28 having supports 23 at either end of the section 28 such that the central portion of the load cell 22 is spaced from the top plate 20. Flanged holes 24 may be provided in the deformable component of the load cell 22 to accentuate the strain when a load is applied to the load cell 22. Strain gauges 26, which may be mounted on the top or bottom of the deformable component of the load cell 22, measure the load applied to the load cell 22, and transmit this measurement to the control unit 16 by the signal transmitting means 14. A deflection stop 27 may be provided to limit the deformation of the deformable component of the load cell 22. FIG. 3 illustrates the weigh module of FIG. 2 when a load is applied.

The system illustrated in FIGS. 1, 2, and 3 operates as follows. When the weigh modules 13 are mounted to the corners of the bed 10, the weight of the bed 10 is applied to the stems 25 of the weigh modules. Applying this load to the stem 25 of the weigh module 13 causes the deformable section 28 of the load cell 22 to deform, as shown in FIG. 3. The extent to which the load cell 22 will deform may be enhanced by providing holes 24 in the load cell, and it may be limited by providing a deformation stop 27. Strain gauges 26 mounted on top of the deformable component of the load cell 22 measure the load applied to the weigh module 13 by measuring the deformation of the load cell 22.

Before a patient is placed in the bed 10, the tare weight of the bed 10 is determined, and the items and their number on the bed, excluding the mattress and bed frame, are reconciled on a list displayed on the control/display unit. The tare weight of the bed 10 should include the weight of the bed frame 11 and mattress 12, and the weight of the specific items which will be placed on the bed with the patient, such as sheets 17, a pillow, or other items. Once the tare weight is initially determined it need not be re-determined unless different items 17 are to be placed on or removed from the bed with the patient.

After the tare weight of the bed 10 is determined, the patient may be placed in the bed 10. The patient may then be weighed on a regular basis, such as daily, by turning on the control/display unit 16. The reconciliation list is again displayed and the items and their number on the bed, excluding the mattress and bed frame, are reconciled against the reconciliation list. The bed is now again tared. When the control/display unit 16 is activated, a signal is sent from each load cell assembly 22, and the load applied to each weigh module 13 is measured. The measurement obtained at each load cell assembly 22 is transmitted to the control/display unit 16, where the measurements are summed. Within the control/display unit 16 a wheatstone bridge 30, as shown in FIG. 8, or other means, may be used to sum the measurements from the weigh modules 13. The total weight of the patient is then displayed.

In a preferred embodiment, each weigh module 13 functions as a stand alone scale. In this embodiment, each weigh module 13 is provided with a circuit board that includes an analog/digital converter, a microprocessor and some memory capacity. The zero calibration and span values for the weigh module, and tare value data for the system, may be stored in the weigh module memory. In this embodiment, the control/display unit 16 need only sum the values transmitted by each of the weigh modules. Alternatively, both the weigh modules 13 and the control/display unit 16 may have memory capacity, so that the zero calibration and span values for the weigh module and tare value data for the system may be stored in each weigh module 13, while preprogrammed tare data for specific items (e.g., the weight of a pillow) may be stored in the control/display unit 16. In addition, incorporating an analog/digital converter in each weigh module allows the measurements obtained to be transmitted as digital signals, reducing the cost and complexity of wiring and further increasing accuracy by reducing the possibility of errors introduced by transmitting measurements as analog signals. Finally, because each weigh module is a stand alone scale in this embodiment, a single weigh module may be replaced or repaired without requiring replacement of the entire set of weigh modules. Using this embodiment, to accurately weigh a patient in a hospital bed, or the contents of a container or weight bearing surface, the load applied to each of the weigh modules is measured at the weigh module and transmitted to the control/display unit through four cables. The zero and span calibration values for each individual weigh module are stored on non-volatile memory in the weigh module so that each weigh module acts as a unique scale. The load applied to the bed is summed by digitally adding the individual loads applied to each of the four weigh modules, thereby reducing the error contributed by unequal span values when the weigh modules are summed in the traditional analog manner. The weight of the patient, or contents of the container, is displayed on the control/display unit.

Alternatively, both the weigh module 13 and control/display unit 16 may have memory capacity so that the zero calibration and span values for the weigh module and tare value date for the system may be stored in the weigh module memory or in the control/display unit memory, and pre-programmed tare data for specific items (e.g., the weight of a pillow) may be stored in the weigh module or control/display unit memory.

Additionally, a "move the bed" or "move the container" function, and an "add or remove an item from the bed" or "add or remove an item from the container" function, may be available in the weigh module 13 memory or control/display unit 16 memory. The control/display unit 16 will display a menu. Choosing the "move" function from the menu will allow the bed or container to be moved without losing tare value data for the system. To move the bed or container without losing tare value date, the pre-move values are stored before the bed or container is moved, and the values are then re-set if necessary after moving, maintaining tare so that the object to be weighed need not be removed from the bed or container. Similarly, choosing the "add or remove" function will allow an item to be added or removed from the bed or container, and will add or subtract the weight of the item from tare, so that the object to be weighed need not be removed from the bed or container. The item to be added or removed is selected from the reconciliation list on the control/display unit 16, and the weight of that item is then automatically added or subtracted from tare.

Figure 13:
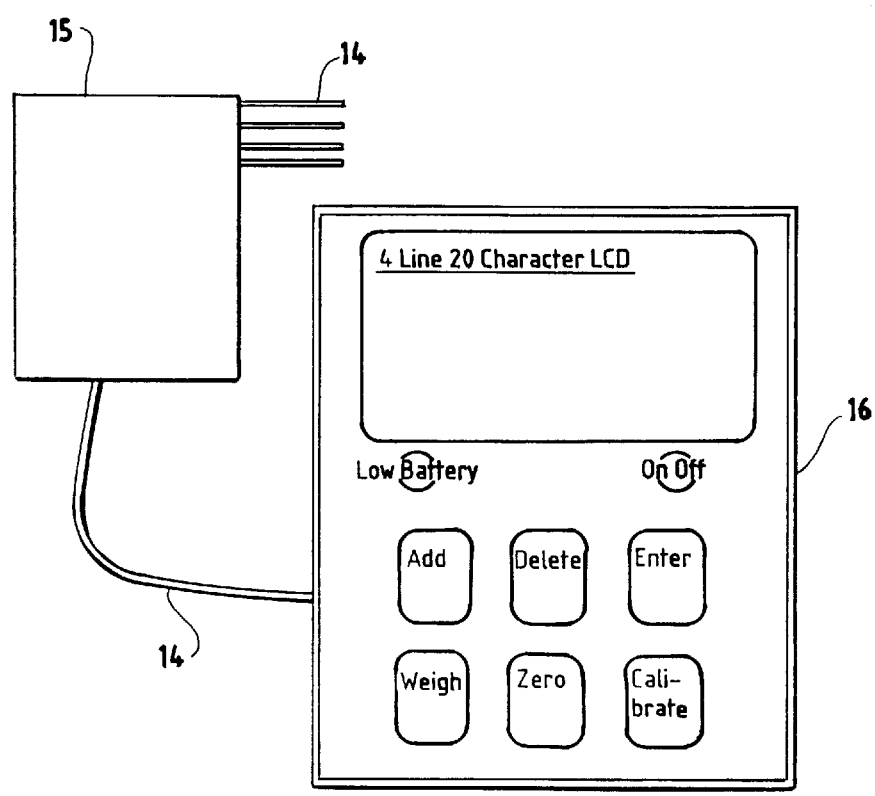
FIG. 13 is a front view of an alternate embodiment of the control panel of the in-bed weighing system.

An embodiment of a control/display unit 16 is shown in FIG. 13. The control/display unit 16 shown includes a display screen area which may be used to prompt the user to enter required information. Preprogrammed data, such as the weight of a pillow, may be stored in the control/display unit 16 to simplify the weighing procedure and tare. To obtain a weight measurement, the user may be prompted to enter information about objects on the bed, such as pillows or sheets, and the weight of those items may be tared off of the weight measurement obtained using the programmed data.

An alternate embodiment of the weigh module 13 is shown in FIG. 4. In that embodiment, a caster 18 is mounted to one end of a load cell 22 by a mounting bracket 19. The mounting bracket 19 may be attached to the load cell 22 by inserting a stem portion of the mounting bracket 19 into the load cell 22. The load cell 22 is comprised of two rigid end sections 31 and a central deformable section 28 which extends from one rigid end section 31 to the other. The caster 18 is mounted to one of the rigid end sections 31, and a stem 25, which may be used to attach the weigh module 13 to a bed frame or other container, extends upward from the other rigid end section 31. As shown in FIGS. 4 and 5, holes 32 may be bored into the deformable section 28 from either side, leaving a thin membrane 29 between the holes 32. In a preferred embodiment, the thickness of the membrane is relative to the size of the load to be applied such that deformation in response to the load applied is pronounced. Mounted on the membrane 29 are strain gauges 26 or other means for determining the load applied to the weigh module. FIG. 6 shows the weigh module of FIGS. 4 and 5 when a load is applied to the weigh module.

In the in-bed patient weighing system described, the control/display unit 16 illustrated in FIGS. 1, 7 and 13 may be stationary, as shown, or a hand held unit may be used. If a hand held unit is used, one control/display unit 16 may be used to obtain weight measurements from several beds; the unit 16 may be connected to each caster mounted weighing system when a measurement is desired, and disconnected after the measurement is obtained. Use of a hand held unit may be preferred in an environment using several weighing systems because of the reduced cost of having just one, rather than several, control/display units, and because data collected from multiple weighing systems using the hand held control/display unit may be downloaded electronically into a computer for further processing.

The weighing system described may also incorporate an alarm feature, as noted in FIG. 7, such that an alarm is triggered if a pre-set change in the weight applied to the bed or surface occurs (as when the patient gets out of the bed, or if a load is removed from a platform).

Figure 9:
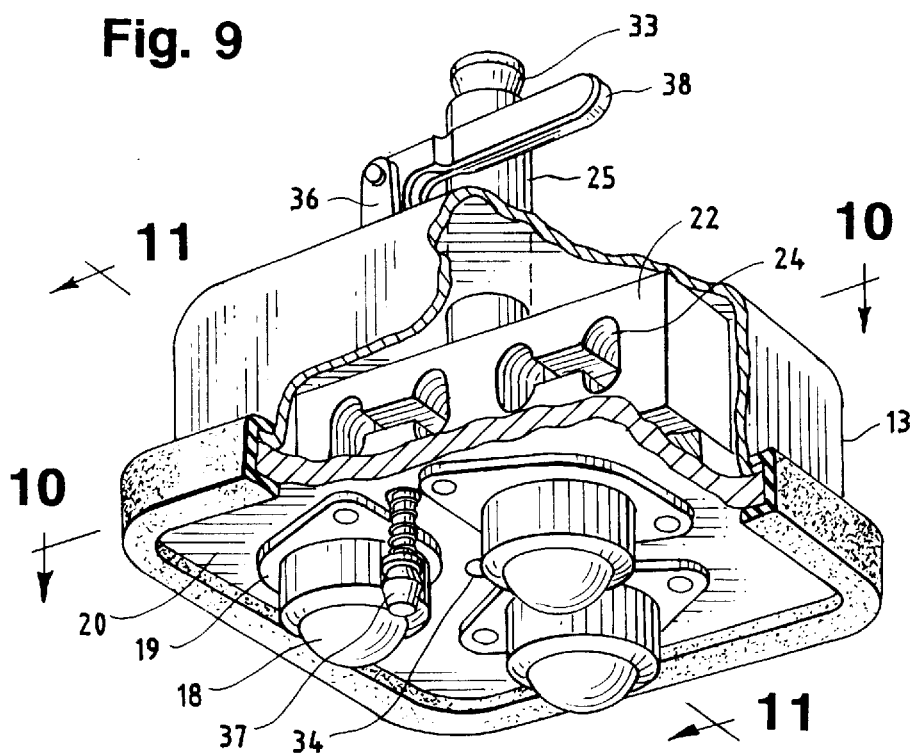
FIG. 9 is a perspective view of another embodiment of the weigh module of the in-bed weighing system.
Figure 10:
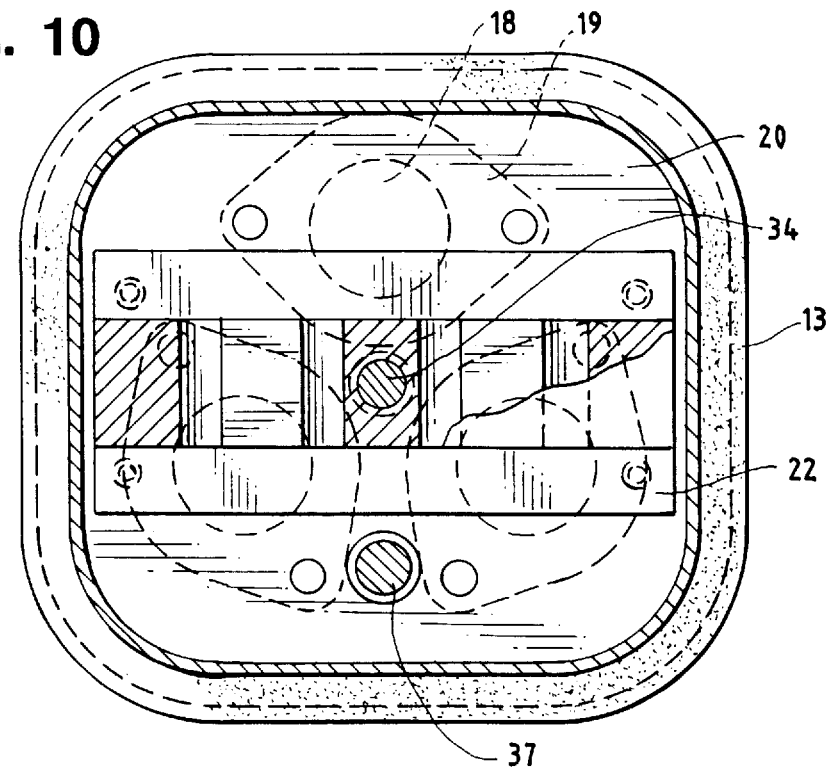
FIG. 10 is a top view of the embodiment of the weigh module shown in FIG. 9.
Figure 11:
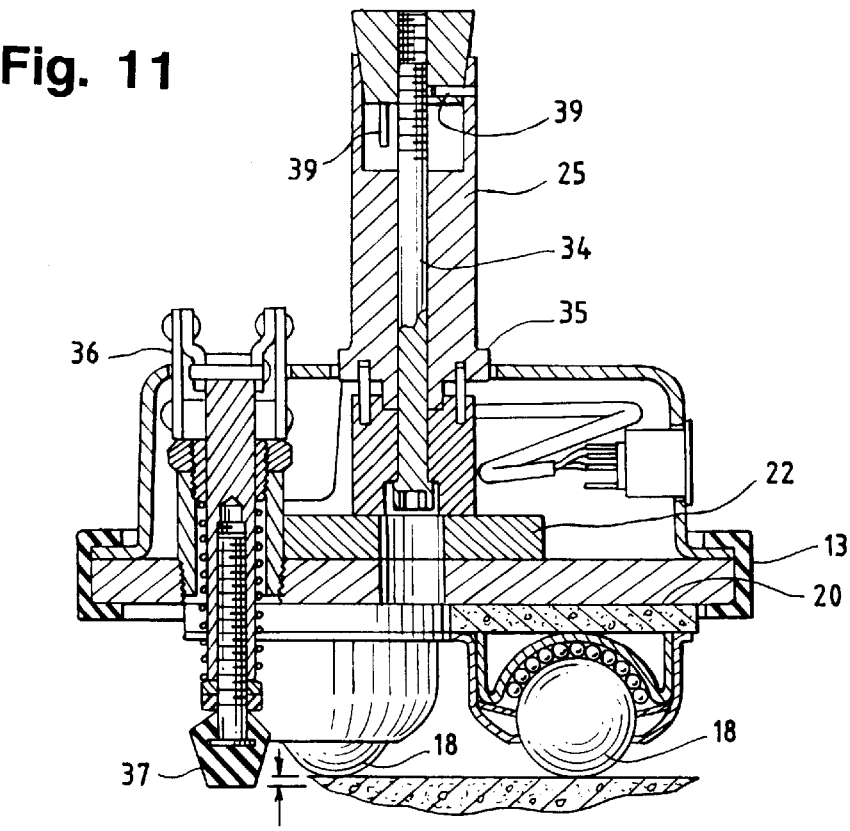
FIG. 11 is a cross-sectional view of the weigh module shown in FIG. 9.
Figure 12:
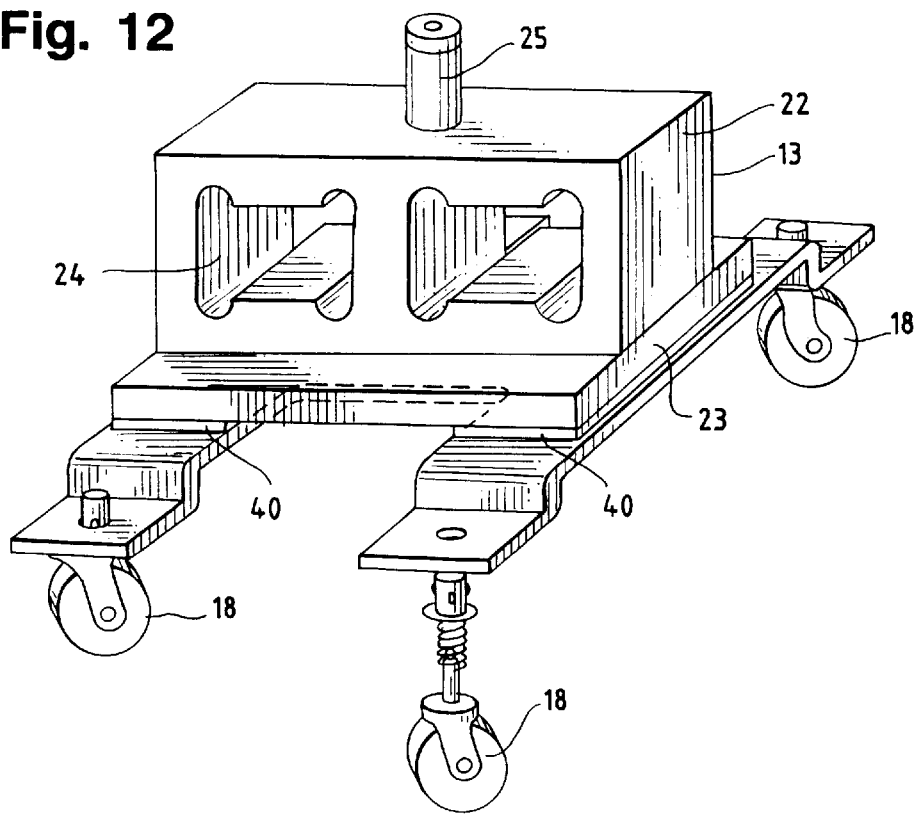
FIG. 12 is a perspective view of another embodiment of the weigh module of the in-bed weighing system showing a suspension system to minimize eccentric loading.

An alternate embodiment of the weigh module 13 is shown in FIGS. 9, 10, and 11. In this embodiment, the weigh module 13 employs a carriage system of three casters or rollers 18 positioned symmetrically around the center line of the leg of the bed or container to be weighed to center the load over the center line of the stem 25. The center of the symmetric pattern is aligned with the load application line through the stem 25. The casters 18 are mounted to a caster top plate 20 by mounting brackets 19, and a load cell 22 is mounted on top of the top plate so that it is centered over the symmetric pattern of the casters 18. The load cell may be connected to the leg of a bed or container by means of the stem 25. The stem 25 is centered over the casters 18 and extends into the center of the load cell 22. Stem 25 is held perpendicular to load cell 22. Centering load cell 22 over the casters 18 prevents eccentric loading and allows the load cell 22 to be parallel to the floor to the extent possible. The weigh module 13 may also be equipped with a brake mechanism 36, such as the plunger 37 and lever 38 shown. In addition, each caster may be provided with a suspension spring (or rubber pad) 40, as shown in FIG. 12, to isolate any non-level motion of the casters 18. The suspension system can also be comprised of a fluid supported pad to isolate the casters from the load cells and thus minimize eccentric inputs from the casters 18.

Another alternate embodiment is shown in FIG. 12. In this embodiment each weigh module employs four casters 18, rather than three. As in the embodiment shown in FIGS. 9–11, in this embodiment the stem 25 is centered over the casters 18 and extends into the center of the load cell 22, and the load cell 22 is centered over the casters 18.

In a preferred embodiment, shown in FIGS. 9, 10 and 11 but also applicable to the embodiments shown in FIGS. 1–6 and 12, the stem 25 is provided with an expanding section 33 which locks the stem 25 into a hollow leg on the bed or platform to be supported. The expanding section 33 is connected to a screw 34 which is located within the stem 25 and passes through the caster top plate 20. The leg of the bed rests on a flange 35 on the stem 25 such that the expanding section of the stem is positioned within the leg. As the screw 34 is tightened, the expanding section 33 expands so as to grip the inside of the leg. Non-torque or centering pins 39 may also be used to position the leg of the bed. This embodiment insures that the load cell is perpendicular to the leg, and parallel to the floor, to the extent possible.

In addition to the embodiments shown and described here, modifications to some features of the weigh module may be made within the scope of the invention. For instance, other forms of casters, rolling balls, distributed rolling elements and suspension systems can be used in other embodiments. These arrangements may tend to distribute the applied loads centrally and reduce or eliminate any offset or eccentric loadings. The weigh modules may also be secured to the bed or container by a collar, clamp, or other attachment means, rather than by a stem.

While the system has been described and illustrated using casters, bed supports that do not facilitate movement of the bed may be used. Thus, weigh modules comprising a support, such as a leg or foot with no wheel attached thereto, and a load cell may be used. Similarly, the weigh modules described may be attached to other types of weight bearing devices, such as containers or shelves. If casters are used, the weight bearing device or bed may be moved from one location to another without affecting the accuracy of the weighing system, provided that a brief stationary period is allowed before using the weighing system.

The system described may also be used in a variety of applications. For example, a device having the primary purpose of serving as a shelving unit may be retrofit with the weigh modules or the weigh modules of the present invention. By retrofitting the shelving unit with the present invention, the storage shelves may act as scales, and inventory may be easily monitored. In addition, the unit may be equipped with an alarm which may be activated when an item is removed from the shelf.

The invention has been described above in an illustrative manner and it is to be understood that terminology which has been used is intended to be in the nature of description rather than of limitation. Obviously, many modifications and variations of the present invention are possible in light of the above teachings. It is therefore to be understood that within the scope of the appended claims, the invention may be practiced otherwise than as specifically described.

What is claimed is:

1. A weighing device comprising:
a weight bearing surface; a frame supporting said surface
least one weigh module supporting said frame, each weigh module including a support removably coupled to the frame independently of other weigh modules, measuring means mounted integrally with the support for measuring the weight applied to the weigh module, and a data storage means;
accumulating means for accumulating and processing the weight information collected from the measuring means, and
transmitting means for transmitting signals between the measuring means on each weigh module and the accumulating means.

2. A device according to claim 1, wherein the accumulating means comprises a control unit.

3. A device according to claim 1, wherein the measuring means comprises a load cell device.

4. A device according to claim 1, wherein the weigh module further comprises a means for isolating the measuring means from the support.

5. A device according to claim 1, wherein the weigh module comprises a support, a load cell device attached to the support, a stem attached to the top of the load cell device and a circuit board.

6. A device according to claim 1, wherein the support comprises a caster.

7. A device according to claim 1, wherein the weigh module comprises a caster, a load cell device attached to the caster, a stem attached to the top of the load cell device and a circuit board.

8. A device according to claim 1, wherein the weigh module further comprises an analog/digital converter and a microprocessor.

9. A device according to claim 1, further comprising a display means.

10. A device according to claim 9, wherein the display means is portable.

11. A device according to claim 3, wherein the load cell device comprises a deformable portion having at least one flanged hole therein and a load cell support at the perimeter of the deformable portion, wherein a measuring device is mounted on the deformable portion of the load cell device.

12. A device according to claim 11, wherein the measuring device is a strain gauge.

13. A device according to claim 3, wherein the load cell device comprises a first load cell support attached to the bed support, a deformable section having a cylindrical hole therein attached to the first load cell support, and a second load cell support attached to the deformable section and to the stem, wherein a measuring device is mounted within the cylindrical hole in the deformable section.

14. A device according to claim 13, wherein the measuring device is a strain gauge.

15. A device according to claim 1, further comprising an alarm.

16. A weighing device comprising:
a weight bearing surface, a frame supporting said surface
a weigh module supporting said frame, wherein said weigh module comprises a support, a load cell device attached to the support, and a stem attached to the top of the load cell device and adapted to be removably connected to the frame, wherein the stem comprises a fixed section and an expandable section, accumulating means for accumulating and processing the weight information collected from the load cell device, and transmitting means for transmitting signals between the load cell device on said weigh module and the accumulating means.

17. A device according to claim 16, wherein the accumulating means comprises a control unit.

18. A device according to claim 16, wherein the support comprises a caster.

19. A device according to claim 16, further comprising a display means.

20. A device according to claim 19, wherein the display means is portable.

21. A device according to claim 16, wherein the load cell device comprises a deformable portion having at least one flanged hole therein and a load cell support at the perimeter of the deformable portion, wherein a measuring device is mounted on the deformable portion of the load cell device.

22. A device according to claim 21, wherein the measuring device is a strain gauge.

23. A device according to claim 16, wherein the load cell device comprises a first load cell support attached to the bed support, a deformable section having a cylindrical hole therein attached to the first load cell support, and a second load cell support attached to the deformable section and to the stem, wherein a measuring device is mounted within the cylindrical hole in the deformable section.

24. A device according to claim 16, further comprising an alarm.

25. An apparatus for weighing a person in a bed, that includes a bed frame, comprising:
- at least three independent weigh modules respectively independently removably connected to the bottom of the bed frame at spaced-apart locations for supporting the bed frame, each of said weigh modules including at least three rollers and a measuring means mounted integrally with the rollers independently of the other weigh modules for measuring the weight applied to the rollers;
- accumulating means for accumulating and processing the weight information collected from each measuring means; and
- transmitting means for transmitting signals between the measuring means and the accumulating means.

26. An apparatus according to claim 25, wherein the accumulating means comprises a control unit.

27. An apparatus according to claim 25, wherein the measuring means comprises a load cell device.

28. An apparatus according to claim 25, wherein the weigh module further comprises a means for isolating the measuring means from the rollers.

29. An apparatus according to claim 25, wherein the weigh module comprises at least three rollers, a load cell device attached to the rollers, and a stem attached to the top of the load cell device.

30. An apparatus according to claim 27, wherein the load cell device comprises a deformable portion having at least one flanged hole therein and a load cell support at the perimeter of the deformable portion, wherein a measuring device is mounted on the deformable portion of the load cell device.

31. An apparatus according to claim 30, wherein the measuring device is a strain gauge.

32. An apparatus according to claim 25, further comprising a display means.

33. An apparatus according to claim 32, wherein the display means is portable.

34. An apparatus according to claim 25, further comprising an alarm.

35. An apparatus according to claim 25, wherein said apparatus is removable from said bed.

* * * * *